United States Patent [19]

Butterfass et al.

[11] Patent Number: 5,565,269
[45] Date of Patent: Oct. 15, 1996

[54] PRODUCTION OF FIBERS CONTAINING MAINLY POLYPROPYLENE

[75] Inventors: Dieter Butterfass, Boehl-Iggelheim; Hans-Joachim Schuhmacher, Neustadt; Michael W. Mueller, Plankstadt, all of Germany

[73] Assignee: BASF Aktiengesellschaft, Ludwigshafen, Germany

[21] Appl. No.: 409,066

[22] Filed: Mar. 23, 1995

Related U.S. Application Data

[62] Division of Ser. No. 241,583, May 12, 1994, Pat. No. 5,466,411.

[30] Foreign Application Priority Data

May 12, 1993 [DE] Germany .................... 43 15 875.7

[51] Int. Cl.⁶ .................... D02G 3/00; D01D 5/10
[52] U.S. Cl. .................... 428/357; 428/395; 428/288; 428/266; 264/37
[58] Field of Search .................... 428/357, 395, 428/288, 266; 264/37

[56] References Cited

U.S. PATENT DOCUMENTS

| | | | |
|---|---|---|---|
| 3,658,579 | 4/1972 | Ottinger et al. | 461/170 |
| 4,863,779 | 9/1989 | Daponte | 428/286 |
| 5,196,470 | 3/1993 | Anderson | 524/379 |
| 5,240,530 | 8/1993 | Fink | 264/37 |
| 5,280,066 | 1/1994 | Tekkanat et al. | 525/64 |
| 5,286,424 | 2/1994 | Su et al. | 264/37 |
| 5,288,349 | 2/1994 | Fink | 156/72 |
| 5,314,743 | 5/1994 | Meirowitz | 428/284 |
| 5,372,885 | 12/1994 | Tabor | 428/395 |
| 5,437,922 | 8/1995 | Jackson | 428/288 |

*Primary Examiner*—Newton Edwards
*Attorney, Agent, or Firm*—Oblon, Spivak, McClelland, Maier & Neustadt, P.C.

[57] ABSTRACT

A process for producing fibers containing polypropylene as the main component by the method of melt spinning comprises melting a new binder-consolidated nonwoven and spinning the melt into new fibers.

7 Claims, No Drawings

PRODUCTION OF FIBERS CONTAINING MAINLY POLYPROPYLENE

This is a Division of application Ser. No. 08/241/583 filed on May 12, 1994, now U.S. Pat. No. 5,466,411.

The present invention relates to a process for producing fibers containing mainly polypropylene by the method of melt spinning.

The use of melt spinning for producing polypropylene fibers is generally known (cf. Ullmann's Encyclopedia of Industrial Chemistry, VCH Verlagsgesellschaft, 5th edition, 1987, Vol. A10, pages 615 to 623).

Polypropylene fibers are suitable inter alia for producing nonwovens which are obtainable by consolidating fiber webs. Alongside mechanical and thermal web consolidation it is in particular consolidation of fiber webs with binders which is of importance. Binder-consolidated fiber webs are used in particular for automotive trim, especially in the form of floor coverings. The latter are also used elsewhere. As well as being chemically consolidated such nonwovens are generally mechanically consolidated, for example by needling.

It is known from Nonwovens Industry 14 (12), 1983, 12–24, that aqueous dispersions of polymers formed from predominantly olefinic monomers and minor amounts of $\alpha,\beta$-monoethylenically unsaturated carboxylic acids are suitable for use as binder for producing nonwovens based on polypropylene fibers.

German Utility Models 9210376, 9210375 and 9210377 disclose processes for recycling products based on polyolefins. However, these processes are unsatisfactory as regards recycling polypropylene fiber nonwovens based on binders comprising aqueous dispersions of polymers predominantly formed from olefinic monomers.

It is an object of the present invention to provide a more advantageous process for recycling polypropylene fiber nonwovens based on binders comprising aqueous dispersions of polymers formed predominantly from olefinic monomers.

We have found that this object is achieved by a process for producing fibers by melt spinning, which comprises melting a nonwoven consisting essentially of:

a) fibers containing at least 80% by weight of polymers containing at least 95% by weight of propylene in polymerized form, and b) from 5 to 60% by weight, based on the fibers a), of a polymeric binder containing at least 70% by weight of a $C_2$–$C_4$-olefin in polymerized form, and spinning the melt into fibers.

Surprisingly, fibers produced in this way are very useful for making new nonwovens.

Preferably the fibers a) contain at least 90, particularly preferably at least 95, % by weight of polymers containing at least 95% by weight, preferably 100% by weight, of propylene in polymerized form. Other possible constituents of the fibers a) include for example polymers containing copolymerized units of ethylene as the main monomer, in particular polyethylene or copolymers of ethylene and propylene. In addition the fibers a) generally contain additives such as antioxidants or photostabilizers. Frequently the fibers a) are also colored. In this case the fibers a) contain suitable colored pigments. Advantageously the pigments are incorporated into the starting melt of the fibers.

The amount used of the polymeric binder b), based on the fibers b), is preferably from 10 to 40, particularly preferably from 10 to 20, % by weight.

The polymeric binder b) can be added to the fiber web for example in the form of a low melting powder or in the form of low melting fibers. In this case the consolidating effect is achieved by briefly heating the mixture to above the melting temperature of the binder b) and then cooling down. However, the preferred way of applying the binder b) is in the form of its aqueous dispersion. Appropriate aqueous polymer dispersions and their preparation are known, preference being given to those aqueous polymer dispersions whose polymers do not require any external dispersants to disperse them in the aqueous medium, ie. polymers which are self-emulsifying. These aqueous polymer dispersions and their preparation are described for example in EP-A-24 034 and DE-A-3 420 168 and U.S. Pat. No. 4 613 679.

Particularly preferred aqueous polymer dispersions of binders b) are aqueous polymer dispersions of self-emulsifying polymers whose polymers contain acidic groups, in particular carboxyl groups, in effective amounts for the purpose of self-emulsification. The self-emulsifying polymers particularly advantageously contain in polymerized form from 70 to 90% by weight of at least one $C_2$–$C_4$-olefin (preferably a $C_2$- or $C_3$-olefin) and from 10 to 30% by weight of at least one $\alpha,\beta$-mono-ethylenically unsaturated mono- and/or dicarboxylic acid of 3 to 8 carbon atoms and/or the anhydride thereof.

Of these, those aqueous polymer dispersions are in turn preferred in which the carboxylic acid comonomers contain 3 to 5 carbon atoms. Particularly preferred carboxylic acid comonomers are acrylic acid and maleic acid or the anhydride thereof. Of course, all or some of the acidic functions can be present in neutralized form. Suitable neutralizing agents are alkali metal hydroxides, amines, which may also carry hydroxyl groups, and in particular ammonia.

Very particularly useful self-emulsifying polymers b) contain from 70 to 90% by weight of ethylene and from 10 to 30% by weight of acrylic acid in polymerized form.

Of these, in turn, are those polymers of advantage which are mown from Nonwovens Industry, 14 (12), 1983, page 16, FIG. 1, or from the BASF AG Technical Information Bulletin Bodenbeläge und Schäume, Epotal ® DS 4024 X, March 1993, Epotal DS 4024 X being a very particularly advantageous aqueous dispersion of polymer b). As a rule, the relative weight average molecular weight of these polymers b) is from about 15,000 to 25,000 and their melt viscosity, determined at 200° C. with an MC 10 from Physica in the following Couette arrangement:

inner cylinder: radius=7 mm; length=21 mm outer cylinder: radius=7.6 mm; (→shear 0.6 mm)

at 10 revolutions per second, is within the range from 10 to 150 pa·s.

The application of the aqueous dispersion of the binder b), the solids content of which is usually from 20 to 30% by weight, to the fiber web can be effected by saturation, spraying, foam application, nip padding, knife coating or printing. The film formation which the polymer dispersion undergoes in the course of drying brings about the consolidation of the fiber web.

To recycle the bonded fiber web it is simply melted and spun in a conventional manner to form new fibers. Advantageously, the bonded fiber web is first mechanically comminuted and densified by heating and then melted in an extruder, extruded and forced through spinnerets. Of course, prior to spinning the melt can have the usual additives added such as coloring pigments.

The fibers thus obtainable, whose staple length is generally from 40 to 120 mm and whose fineness is normally from 10 to 70 dtex, are very useful for making new nonwovens. In the case of chemically consolidated nonwovens the binder to be used is essentially free of any restrictions. Preference is given to using a binder b).

The process for recycling polypropylene fiber nonwovens according to the invention is advantageous over those recycling processes whose purpose is to dissolve the polymeric binder out of the nonwoven and to reuse the resulting fiber web in that there is no binder solution to dispose of.

If the new nonwoven is always made using binder b), the process of the invention can of course be employed repeatedly in succession.

If the passage of a plurality of such cycles leads to a decrease in the melting point of the recycled fibers, these may be suitable for use as fusion binders for new polypropylene fibers.

Of course, the process of the invention also extends to those nonwovens which include as a further structural element a rearwardly applied polyolefin film or a rearwardly applied polyolefin in powder form, in both cases in particular of polypropylene.

EXAMPLE (the fiber fineness is reported as the linear density (mass per unit length) in tex; 1 tex=1 $g \cdot 10^{-3} m^{-1}$)

a) Commercially available polypropylene staple fibers (staple length: 80 mm) of differing fineness were measured by the method of DIN 53 834 to determine the tenacity (cN/tex) and elongation at break (%, based on the original length). Results are shown in Table 1.

TABLE 1

| Fineness [dtex] | Tenacity (cN/tex) | Elongation (%) |
| --- | --- | --- |
| 20.0 | 32.0 | 128.7 |
| 15.5 | 35.0 | 117.1 | b) Needled fiber webs formed from the staple fibers a) in a weight of 700 g/m² were impregnated in the nip of a roll padder with Epotal DS 4024 X (25% strength by weight aqueous polymer dispersion of a copoylmer formed from 80% by weight of ethylene and 20% by weight of acrylic acid) and dried (drying temperature: 125° C.). The binder content of the resulting nonwovens was 30% by weight, based on the weight of the starting fibers.

The resulting nonwovens were mechanically comminuted, densified by heating, melted in an extruder, extruded and forced through spinnerets. The dimensions were chosen in such a way as to produce staple fibers having a fineness of 20.2 or 15.2 dtex and a staple length of 80 mm.

The mechanical properties of these recycled staple fibers were determined as in a). The results are shown in Table 2.

TABLE 2

| Fineness [dtex] | Tenacity (cN/tex) | Elongation (%) |
| --- | --- | --- |
| 20.2 | 26.2 | 128 |
| 15.2 | 32.8 | 127 | c) The recycled staple fibers of b) were used to produce nonwovens as in b). The quality of the resulting nonwovens was essentially indistinguishable from that of the nonwovens resulting in b).

Likewise essentially indistinguishable were the qualities of floor coverings made from the nonwovens of b) and the nonwovens of c).

We claim:

1. Fibers, which are produced by melt spinning, which comprises:
   a) melting a non-woven consisting essentially of:
      i) fibers containing an effective amount of polymers, said polymers containing at least 95% by weight of polypropylene; and
      ii) from 5% to 60% by weight, based on the fibers i), of a polymeric binder containing from 70% to 90% by weight of at least one $C_2$–$C_4$-olenfin, and from 10% to 30% by weight of at least one α,β-monoethylenically unsaturated mono- or dicarboxylic acid of 3 to 8 carbon atoms or both, or the anhydride thereof or a mixture thereof; and
   b) spinning the melt into fibers.

2. The fibers of claim 1, wherein said fibers i) contain 100% by weight of polypropylene.

3. The fibers of claim 2, wherein said fibers i) contain 100% by weight of recycled polypropylene.

4. The fibers of claim 1, wherein said polymeric binder ii) is used in an amount of from 10 to 40% by weight based on the fibers i).

5. The fibers of claim 1, wherein said polymeric binder ii) comprises from 10% to 30% by weight of at least one α,β-monoethylenically unsaturated mono- or di-carboxylic acid of 3 to 5 carbon atoms or both, or the anhydride thereof or a mixture thereof.

6. The fibers of claim 1, wherein said polymeric binder contains from 70 to 90% by weight of ethylene, and from 10 to 30% by weight of acrylic acid, each in polymerized form.

7. The fibers of claim 1, which have a stable length of from 40 to 120 mm and a fineness of from 10 to 70 dtex.

* * * * *